(12) United States Patent
Lin

(10) Patent No.: US 9,533,218 B1
(45) Date of Patent: Jan. 3, 2017

(54) MODERATION OF ANTISOCIAL BEHAVIOR IN CHAT VIA GAME MECHANICS

(71) Applicant: KABAM, INC., San Francisco, CA (US)

(72) Inventor: Michael Lin, San Diego, CA (US)

(73) Assignee: KABAM, INC., San Francisco, CA (US)

( * ) Notice: Subject to any disclaimer, the term of this patent is extended or adjusted under 35 U.S.C. 154(b) by 246 days.

(21) Appl. No.: 14/200,005

(22) Filed: Mar. 6, 2014

(51) Int. Cl.
  *A63F 9/24* (2006.01)
  *A63F 13/00* (2014.01)
  *G06F 17/00* (2006.01)
  *G06F 19/00* (2011.01)
  *A63F 13/30* (2014.01)

(52) U.S. Cl.
  CPC .................................... *A63F 13/12* (2013.01)

(58) Field of Classification Search
  CPC ................................ A63F 13/12; A63F 13/75
  USPC ................................................ 463/42, 29, 7
  See application file for complete search history.

(56) References Cited

U.S. PATENT DOCUMENTS

| | | | | |
|---|---|---|---|---|
| 2005/0282624 A1* | 12/2005 | Kane | ....................... | A63F 13/12 463/25 |
| 2007/0225071 A1* | 9/2007 | Van Luchene | .......... | A63F 13/10 463/29 |
| 2009/0113554 A1* | 4/2009 | Zalewski | ................ | A63F 13/12 726/26 |
| 2009/0253475 A1* | 10/2009 | Thompson | .............. | A63F 13/12 463/7 |
| 2011/0107239 A1 | 5/2011 | Adoni et al. | ................... | 715/757 |
| 2012/0004038 A1* | 1/2012 | Van Luchene | .......... | G07F 17/32 463/42 |

OTHER PUBLICATIONS

IGN, "Bounties (GTA Online)," Oct. 7, 2013, https://web.archive.org/web/20131007074335/http://www.ign.com/wikis/gta-5/Bounties_(GTA_Online).*
Lesters and Bounties—Grand Theft Auto 5 Online [Retrieved online on Feb. 6, 2014] URL http://www.supercheats.com/grand-theft-auto-5-online/walkthrough/lester-and-bounties.
(Continued)

*Primary Examiner* — Kevin Y Kim
(74) *Attorney, Agent, or Firm* — Sheppard Mullin Richter & Hampton LLP

(57) ABSTRACT

A system and method configured to deter anti-social behavior within chat rooms related to online gaming environments. The system and method include executing an instance of an online game, and using the instance of the online game to facilitate participation by the users in the online game via a client computing devices. Inventories of virtual items under the control of individual users of the online game are managed. The system and method includes hosting a chat session between users and receiving a selection entered through the chat interface by the first user of a requested retribution action against a second user in response to a perceived offensive action initiated by said second user, the selection of the requested retribution action pledging a bounty of one or more virtual items in an inventory to any user that successfully makes retribution against the second user in the online game. The system and method may also include determining whether or not a requested retribution action should be imposed against the second user in response to the selection of the requested retribution action, such determination being made based upon at least one predetermined condition being satisfied.

18 Claims, 3 Drawing Sheets

(56) References Cited

OTHER PUBLICATIONS

Eve Online update overhauls bounty hunting—Destructoid [Retrieved online Feb. 6, 2014] URL http://www.destructoid.com/eve-online-update-overhauls-bounty-hunting: 239962.phtml.

* cited by examiner

MODERATION OF ANTISOCIAL BEHAVIOR IN CHAT VIA GAME MECHANICS

FIELD OF THE DISCLOSURE

This disclosure relates to providing a deterrent to offensive behavior within chat environments relating to online gaming applications.

BACKGROUND

It is difficult to eliminate profanity, racist comments and other offensive and anti-social behavior within chat using automated means such as word filters because there are many variants to profanity and ways to foil contextually insensitive filtering (inserting symbols or extraneous letters into profanity, coming up with new terminology to refer to targeted groups, etc.)

The aforementioned behavior within chat can and does occur within chat environments tied to online gaming. In this context, attempts to deter this type of behavior typically requires manual administrator intervention and/or tools as mentioned above which can be largely ineffective.

SUMMARY

One aspect of the disclosure relates to a system and method configured to deter anti-social behavior within chat rooms related to online gaming environments. In some implementations, the system and method include executing an instance of an online game, and using the instance of the online game to facilitate participation by the users in the online game via a client computing devices. Facilitating participation in the online game includes facilitating battles between game entities associated with and/or controlled by the individual users in the online game. In some implementations, inventories of virtual items under the control of individual users of the online game are managed, including a first inventory of one or more virtual items under control of a first user in the online game.

The system and method includes hosting a chat session between users, wherein the chat session is presented to the users through a chat interface on the client computing devices. In some implementations, the system and method includes receiving a selection entered through the chat interface by the first user of a requested retribution action against a second user in response to a perceived offensive action initiated by said second user, the selection of the requested retribution action pledging a bounty of one or more virtual items in the first inventory to any user that successfully makes retribution to the second user in the online game. The system and method may also include determining whether or not a requested retribution action should be imposed against the second user in response to the selection of the requested retribution action, such determination being made based upon at least one predetermined condition being satisfied.

In some implementations, the system and method may initiate the requested retribution action as an initiated retribution action against the second user in response to an indication from said determination component and monitor battles in the online game involving game entities associated with and/or controlled by the second user, and such that by virtue of initiation of the initiated retribution action, and in response to one or more game entities associated with and/or controlled by a third user defeating one or more game entities associated with and/or controlled by the second user in a battle in the online game, the bounty of one or more virtual items is moved from the first inventory to a third inventory associated with the third user.

In exemplary implementations, deterring anti-social behavior in a chat environment associated with an online game may be performed by processors executing computer program components. In some implementations, the system may include one or more servers. The server(s) may be configured to communicate with one or more client computing platforms according to a client/server architecture. The users may access the system via the client computing platforms, for instance, to engage in one or more games and/or to engage in chat via the chat interface.

The server(s) may be configured to execute one or more computer program components to provide one or more games to users (or players). The computer program components may include one or more of a game component, a user component, a chat component, a retribution selection component, a determination component, a retribution initiation component, a retribution execution component and/or other components. It is noted that the client computing platforms may include one or more computer program components that are the same as or similar to the computer program components of the server(s) to facilitate individualized content made available to the users of online games.

The game component may be configured to execute an instance of an online game, and to use the instance of the online game to facilitate participation by users in the online game via client computing devices wherein the online game facilitates battles between game entities associated with and/or controlled by the individual users in the online game.

The user component may be configured to manage inventories of virtual items under the control of the individual users in the online game, such inventories including a first inventory of one or more virtual items under control of a first user in the online game.

The chat component may be configured to host a chat session between the users, wherein the chat session is presented to the users through a chat interface on the client computing devices.

The retribution selection component may be configured to receive a selection entered through the chat interface by the first user of a requested retribution action against a second user in response to a perceived offensive action initiated by said second user, the selection of the requested retribution action pledging a bounty of one or more virtual items in the first inventory to any user that successfully makes retribution to the second user in the online game.

The determination component may be configured to determine whether or not a requested retribution action should be imposed against said second user in response to the selection of the requested retribution action, such determination being made based upon at least one predetermined condition being satisfied.

The retribution initiation component may be configured to initiate the requested retribution action as an initiated retribution action against said second user in response to an indication from said determination component.

The retribution execution component may be configured to monitor battles in the online game involving game entities associated with and/or controlled by the second user, and such that by virtue of initiation of the initiated retribution action, and in response to one or more game entities associated with and/or controlled by a third user defeating one or more game entities associated with and/or controlled by the second user in a battle in the online game, the bounty of one or more virtual items is moved from the first inventory to a third inventory associated with the third user.

One aspect of the disclosure relates to a computer-implemented method for deterring anti-social behavior in a chat environment associated with online games, the method being implemented in a computer system that includes one or more physical processors and storage media storing machine-readable instructions. The method may be implemented in a computer system that includes one or more physical processors and storage media storing machine-readable instructions. The method includes executing an instance of an online game. The method further includes implementing the instance of the online game to facilitate participation of the user in the online game. The method further includes managing inventories of virtual items under the control of the individual users in the online game, such inventories including a first inventory of one or more virtual items under control of a first user in the online game.

The method further includes hosting a chat session between the users, wherein the chat session is presented to the users through a chat interface on the client computing devices. The method further includes receiving a selection entered through the chat interface by the first user of a requested retribution action against a second user in response to a perceived offensive action initiated by said second user, the selection of the requested retribution action pledging a bounty of one or more virtual items in the first inventory to any user that successfully makes retribution to the second user in the online game. The method further includes determining whether or not a requested retribution action should be imposed against said second user in response to the selection of the requested retribution action, such determination being made based upon at least one predetermined condition being satisfied. The method further includes initiating the requested retribution action as an initiated retribution action against said second user in response to an indication from said determination component.

The method further includes monitoring battles in the online game involving game entities associated with and/or controlled by the second user, and such that by virtue of initiation of the initiated retribution action, and in response to one or more game entities associated with and/or controlled by a third user defeating one or more game entities associated with and/or controlled by the second user in a battle in the online game, the bounty of one or more virtual items is moved from the first inventory to a third inventory associated with the third user.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
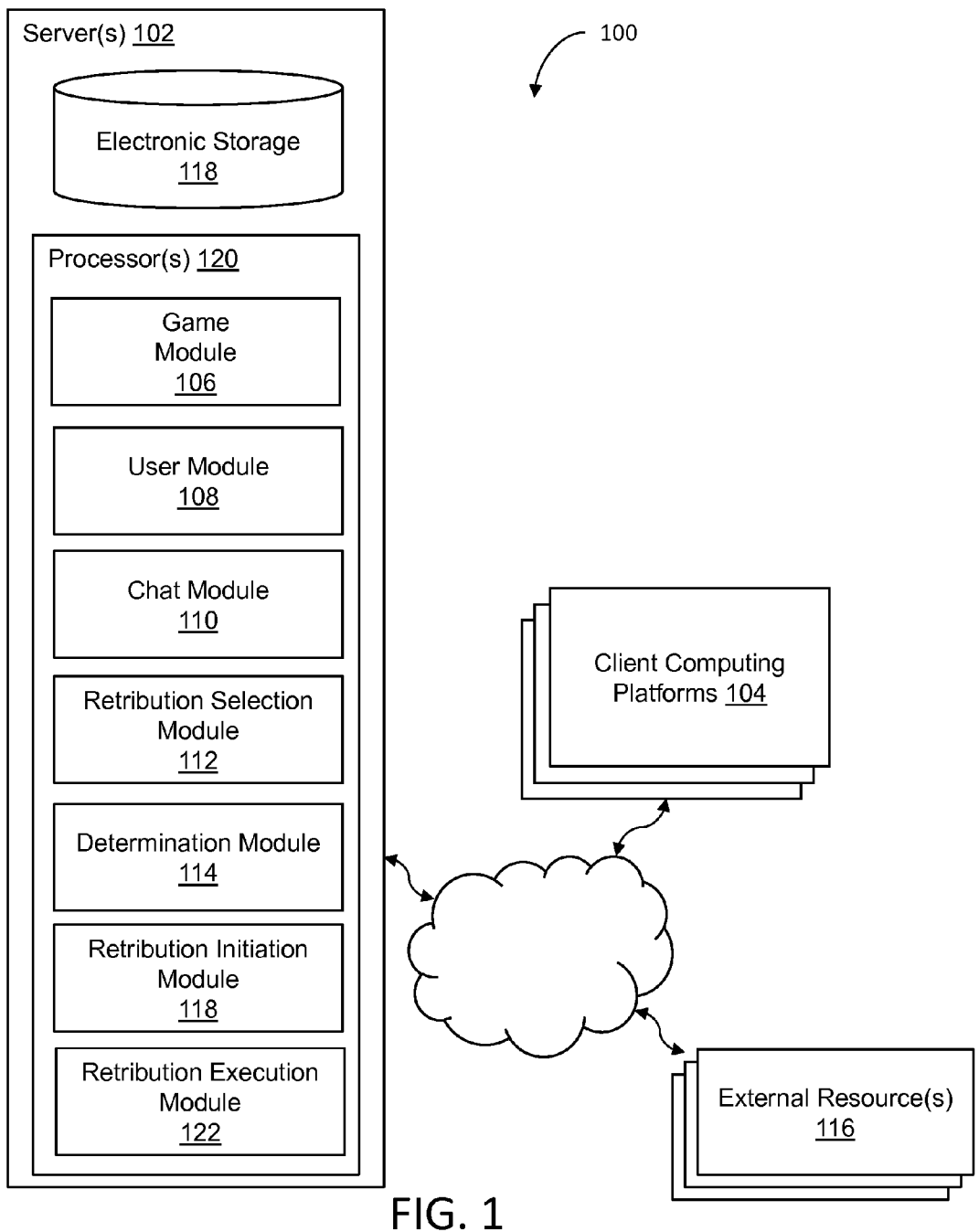
FIG. 1 illustrates a system configured to provide a virtual space, in accordance with one or more implementations.

FIG. 1 illustrates a system 100 configured to provide a virtual space. System 100 is only one example of a suitable computing environment and is not intended to suggest any limitation as to the scope of use or functionality of the features described herein. Providing the virtual space may include hosting the virtual space over a network.

In this disclosure, a system and methodology which enables a community of online game players to enforce its own standards in the context of a chat environment associated with the online game(s). Accordingly, embodiments may be configured such that this system could be used as a either a primary or secondary tool for deterring unwelcome behavior in chat environments. This behavior may relate to the use of profanity, making personal attacks against another player, making racist and/or offensive comments and/or other statements or communications that the community as a whole would prefer to reduce or eliminate.

Embodiments may be configured such that the features herein disclosed could be used in a primary function to deter the aforementioned behaviors or, alternatively, these features could be employed as an additional tool to complement solutions such as manual administrator monitoring and involvement, muting and reporting and/or automated means such as word filters and other software based tools.

According to the present invention, the system and methodology provides an offended or concerned party that becomes aware of the undesirable behavior to address the same in a timely way without requiring any official action or having to leave the fiction of the gaming environment. The system of the present invention permits an offended party to seek retribution as well as generally deter the behavior in the applicable environment. Further, these goals can be achieved without having to remove offending players from the gaming or chat environments.

According to the present invention, there exists a chat environment which allows a chat participant that is concerned about in-chat conduct by another participant to, for example, click on that participant's name or other identifying information. This may invoke the display of a contextual menu which provides access to one or more features to include a feature which allows the concerned participant to seek retribution as against the offending participant. The contextual menu, may, for example, provide access to additional social features such as inviting other participants to participate in groups, alliances as well as other typical social interactions between and among participants.

In a preferred embodiment of the present invention, this contextual menu is well integrated into other aspects of the gaming and/or chat interfaces so as not to discourage chat participation in general. According to the present invention, the contextual menu may provide access to one or both of punitive features such as "scout for attack" or "place bounty". Upon selection of one or both of these features by a concerned participant, a message may be posted in the chat and/or gaming environment which notifies some or all players that a participant has attacked this concerned participant or that a bounty has placed on the offending participant. In some embodiments, additional participants which become aware of these notifications may contribute additional bounty as against the offending participant and/or seek to attack the offending participant via the applicable game(s).

According to the present invention, the ability to place a bounty on an offending participant provides both a deterrent and a punitive benefit towards in-chat behavior. In a preferred embodiment, the participant which initiates the bounty offers up at least one virtual good or other item of value in return for the achievement of some in-game action as against the offending participant. This might involve defeating one of the participants in-game characters in a battle, for example, or any other in-game action that could conceivably be viewed as detrimental to the offending participant.

In some embodiments, as other participants become aware of an available bounty, they may contribute additional virtual goods or other items to the available bounty. These virtual goods or other items may include, for example, virtual currency. If and when the actions required to be achieved in order to win the bounty are in fact achieved, the applicable virtual goods or other items are transferred from the accounts of the participants offering up their portion of the bounty to the account of the player achieving the required actions for obtaining the bounty. In a preferred embodiment of the present invention, the identity of all players who initiate and/or contribute to a bounty should be publicly available so as to minimize abuses of the bounty system.

In some implementations, system 100 may include one or more servers 102. The server 102 may be configured to communicate with one or more client computing platforms 104 according to a client/server architecture. The users may access system 100 and/or the virtual space via client computing platforms 104, for instance, to engage in one or more games.

The server(s) 102 may be configured to execute one or more computer program components. The computer program components may include one or more of a game component 106, a user component 108, a chat component 110, a retribution selection component 112, a determination component 114, a retribution initiation component 118, a retribution execution component 122 and/or other components. As noted, the client computing platform(s) 104 may include one or more computer program components that are the same as or similar to the computer program components of the server(s) 102 to facilitate in-game actions.

The game component 106 may be configured to execute an instance of a game to facilitate presentation of the game to users. The game component 106 may be configured to implement in-game actions in the instance of the game, in response to action requests for the in-game actions by the users.

The game may be provided via a virtual space, and may include a plurality of resource types and/or maps. An instance of the virtual space may be executed by computer components to determine views of the virtual space. The views may then be communicated (e.g., via streaming, via object/position data, and/or other information) from server(s) 102 and/or sources to client computing platforms 104 for presentation to users. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104 that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial section of the space. In some instances, the topography may describe a volume with one or more bodies positioned therein (e.g., a simulation of gravity-deprived space with one or more celestial bodies positioned therein). The instance executed by the computer components may be synchronous, asynchronous, and/or semi-synchronous.

The above description of the manner in which views of the virtual space are provided is not intended to be limiting. The virtual space may be expressed in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the virtual space that corresponds to an individual user. The user character may be controlled by the user with which it is associated.

User-controlled element(s) may move through and interact with the virtual space (e.g., non-user characters in the virtual space, other objects in the virtual space). The user-controlled elements controlled by and/or associated with a given user may be created and/or customized by the given user. The user may have an "inventory" of virtual goods and/or currency (e.g., resources of the plurality of resource types) that the user can use (e.g., by manipulation of a user character or other user-controlled element, and/or other items) to perform in-game actions within the virtual space.

The users may participate in the instance of the virtual space by controlling one or more of the available user-controlled elements in the virtual space. Control may be exercised through control inputs and/or commands input by the users through client computing platforms 104. The users may interact with each other through communications exchanged within the virtual space. Such communications may include one or more of textual chat, instant messages, private messages, voice communications, and/or other communications. Communications may be received and entered by the users via their respective client computing platforms

104. Communications may be routed to and from the appropriate users through server(s) 102. In implementations, the game component 106 may also be configured to implement the delivery of promotional avatars to qualified player in connection with in-game implementation as described herein.

The instance of the online game may be persistent. That is, the online game may continue on whether or not individual users are currently logged in and/or participating in the online game. A user that logs out of the online game and then logs back in some time later may find the game space associated with the online game has been changed through the interactions of other users with the game space during the time the user was logged out. These changes may include changes to the simulated physical space, changes in the user's inventory, changes in other users' inventories, changes experienced by non-user characters, and/or other changes.

The user component 108 may be configured to manage inventories of virtual items which are owned and/or controlled by participants in online games. These virtual items may include, for example, virtual currency which may provide some in-game and/or game-external value. User component 108 preferably tracks inventories of these items on a participant by participant basis through the use of participant accounts. User component 108 is preferably capable of transferring virtual items from one participant's account to other participant accounts when required, such as, for example, when a bounty is achieved as described herein.

Chat component 110 may be configured to host one or more chat sessions either directly integrated into game play or external to the one or more games but nonetheless associated therewith. In some implementations, the chat functionality is achieved through the presentation of a chat interface on a client computing device in use by a participant.

Retribution selection component 112 may be configured to receive a selection entered through a chat interface by a participant that may be concerned about in-chat behavior by another participant. In some implementations, this may involve the pledging by the concerned participant of a bounty as against the other participant which may include one or more virtual items which may be owned or controlled by the concerned participant. According to preferred embodiment, these virtual items may be stored in the account of the concerned participant and be available for transfer to another participant that accepts the bounty challenge and successfully completes the actions required by the concerned participant for achieving the bounty. In some embodiments, the particular virtual items to be contributed by be selected by the concerned participated based on the virtual items that he or she has available.

The required actions may be selected by the concerned participant from a universe of available required actions made available by the system of the present invention and/or these actions may be custom designed by the participant. Examples of such required actions may include, defeat of an in-game character controlled by the participant who has behaved in the perceived offensive manner and/or other actions designed to be detrimental to this participant's status or capabilities in connection with game play.

Determination component 114 may be configured to determine whether or not a requested retribution action should be initiated as against the perceived offensive participant as requested by the concerned participant. This determination may be made by determination component 114 based on one or more conditions as may be imposed by either the concerned participant, a system administrator, system 100 itself or some combination thereof. In some embodiments, exemplary conditions may include the participation of a minimum number of participants beyond the concerned participant in establishing and/or contributing to the bounty. A time limit may be set for such participation and if the minimum level of participation is not achieved, determination component will not instruct retribution initiation component 118 to initiate the bounty. Alternatively or in addition a minimum level of virtual goods or virtual currency may be required to initiate a bounty as against a perceived offensive participant.

In some embodiments, determination component 114 may be configured such that one or more other limitations may be placed on the decision to implement a bounty. For example, system 100 may be configured such that there is a limit on the number of requests for bounty that may be made by any participant in any period of time. Similarly, determination component 114 may be configured such that a participant who has historically requested the initiation of bounties but which such request has not been collaborated by other users (either by agreeing to the bounty and/or contributing virtual goods to the bounty), could be denied the ability to initiate any further bounties at all or for some period of time. In some embodiments, determination component 114 may be configured such that no bounty may be implemented without the affirmative acceptance and agreement by one or more administrators, users, and/or identified players of the applicable game(s).

Retribution initiation component 118 may be configured to initiate a bounty as against a perceived offensive participant as and when instructed to do so by determination component 114. As noted above, this represents the availability of a bounty for one or more players to achieve should they satisfy the required conditions. In some embodiments, retribution initiation component 118 may operate so as to notify some or all players or potential players of applicable games that the bounty is available at or around the time that the bounty is initiated.

Retribution execution component 122 may be configured to monitor in game activities such as battles in an online game to the extent these activities involve one or more game entities such as game characters controlled by a chat room participant who has been previously perceived as offensive in a chat room. As discussed above, this occurs following the initiation of a bounty as directed by determination component 114 and as initiated by retribution initiation component 118. In some embodiments, retribution execution component 122 is further configured to move virtual items as described from the accounts of one or more players who have contributed to the bounty to the account(s) of one or more players who have achieved the bounty.

In some implementations, server(s) 102, client computing platforms 104, and/or external resources 116 may be operatively linked via one or more electronic communication links. For example, such electronic communication links may be established, at least in part, via a network such as the Internet and/or other networks. The network may be a wired or wireless network such as the Internet, an intranet, a LAN, a WAN, a cellular network or another type of network. It will be understood that the network may be a combination of multiple different kinds of wired or wireless networks. It will be appreciated that this is not intended to be limiting, and that the scope of this disclosure includes implementations in which server(s) 102, client computing platforms 104, and/or external resources 116 may be operatively linked via some other communication media.

A given client computing platform 104 may include one or more processors configured to execute computer program components. The computer program components may be configured to enable an expert or user associated with the given client computing platform 104 to interface with system 100 and/or external resources 116, and/or provide other functionality attributed herein to client computing platforms 104. By way of non-limiting example, the given client computing platform 104 may include one or more of a desktop computer, a laptop computer, a handheld computer, a tablet computing platform, a netbook, a smartphone, a gaming console, and/or other computing platforms.

External resources 116 may include sources of information, hosts and/or providers of virtual environments outside of system 100, external entities participating with system 100, and/or other resources. In some implementations, some or all of the functionality attributed herein to external resources 116 may be provided by resources included in system 100.

Server 102 may include electronic storage 118, one or more processors 120, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 118 may comprise non-transitory storage media that electronically stores information. The electronic storage media of electronic storage 118 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processor 120, information received from server 102, information received from client computing platforms 104, and/or other information that enables server 102 to function as described herein.

Processor(s) 120 is configured to provide information processing capabilities in server 102. As such, processor 120 may include one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may include a plurality of processing units. These processing units may be physically located within the same device, or processor 120 may represent processing functionality of a plurality of devices operating in coordination. The processor 120 may be configured to execute components 106, 108, 110, 112, 114, 118 and 122. Processor 120 may be configured to execute components 106, 108, 110, 112, 114, 118 and 122 by software; hardware; firmware; some combination of software, hardware, and/or firmware; and/or other mechanisms for configuring processing capabilities on processor 120. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 106, 108, 110, 112, 114, 118 and 122 are illustrated in FIG. 1 as being implemented within a single processing unit, in implementations in which processor 120 includes multiple processing units, one or more of components 106, 108, 110, 112, 114, 118 and 122 may be implemented remotely from the other components. The description of the functionality provided by the different components 106, 108, 110, 112, 114, 118 and 122 described above is for illustrative purposes, and is not intended to be limiting, as any of components 106, 108, 110, 112, 114, 118 and 122 may provide more or less functionality than is described. For example, one or more of components 106, 108, 110, 112, 114, 118 and 122 may be eliminated, and some or all of its functionality may be provided by other ones of components 106, 108, 110, 112, 114, 118 and 122. As another example, processor 120 may be configured to execute one or more additional components that may perform some or all of the functionality attributed below to one of components 106, 108, 110, 112, 114, 118 and 122.

Figure 2:
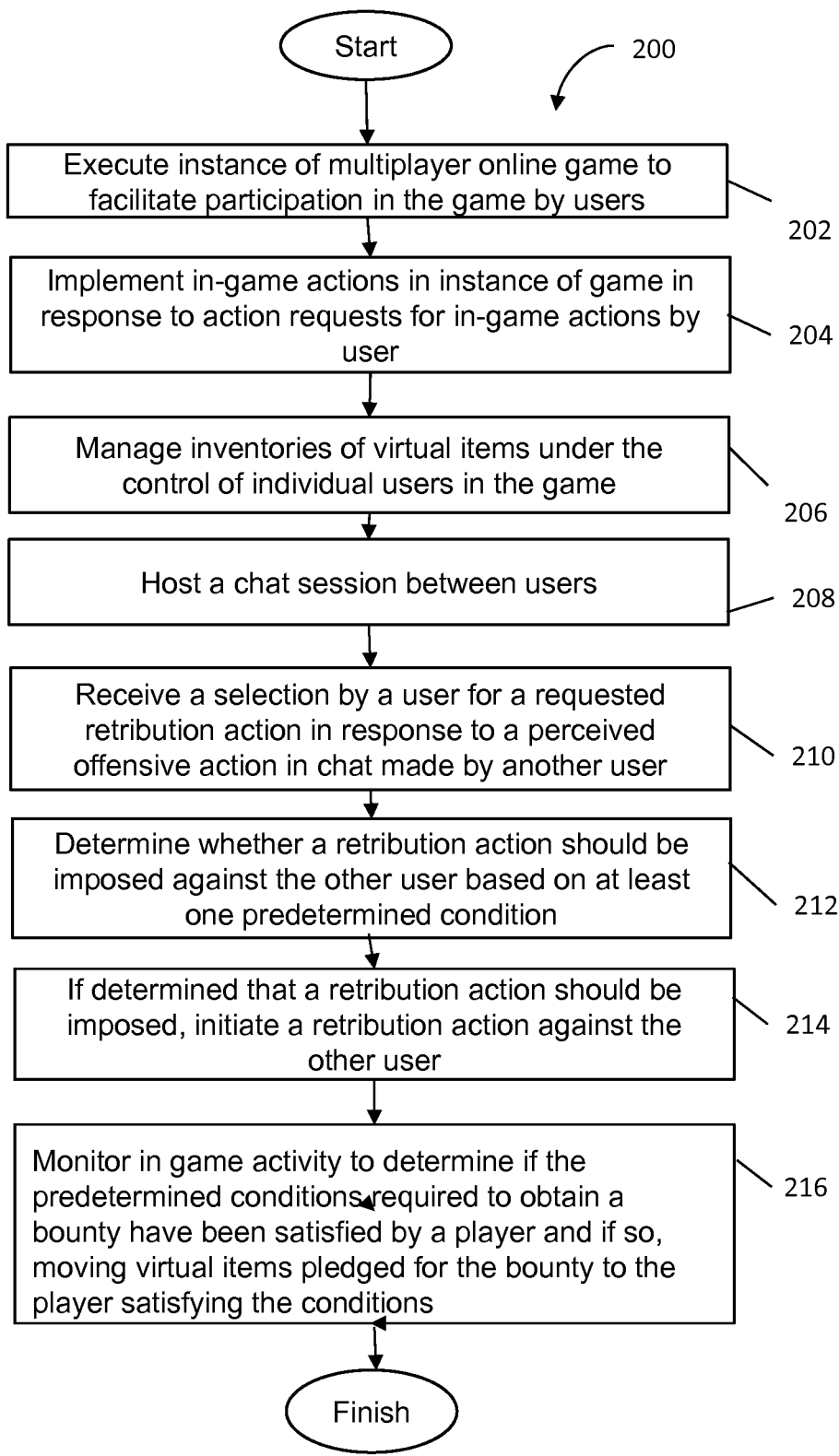
FIG. 2 illustrates a method of hosting a virtual space to client computing devices for interaction by users, including deterring anti-social behavior in chat according to the teachings of the present invention.

FIG. 2 illustrates a method for moderating communication between users in a virtual space, in accordance with one or more implementations. The operations of method 200 presented below are intended to be illustrative. In some embodiments, method 200 may be accomplished with one or more additional operations not described, and/or without one or more of the operations discussed. Additionally, the order in which the operations of method 200 are illustrated in FIG. 2 and described below is not intended to be limiting.

In some embodiments, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of a multiplayer online game may be executed to facilitate participation in the game by users. Operation 202 may be performed by a game component that is the same as or similar to game component 106, in accordance with one or more implementations.

At an operation 204, in-game actions may be implemented in the instance of the game in response to action requests by the users. The in-game actions may include the user moving user-controlled elements, cooperating with other users carrying out cooperative actions, etc. Operation 204 may be performed by a game component that is the same as or similar to game component 106, in accordance with one or more implementations.

At an operation 206, inventories of virtual items under the control of individual users in the game are managed. These virtual items may include virtual currency or any other item which may or may not have value in game play or otherwise. Operation 206 may be performed by a user component that is the same as or similar to user component 108, in accordance with one or more implementations.

At operation 208, a chat session is initiated for hosting a chat environment permitting users to communicate with one another. This chat environment preferably includes a menu functionality permitting users to interact in various ways with other users involved in the chat session. Operation 208 may be performed by a chat component that is the same as or similar to chat component 110, in accordance with one or more implementations.

At an operation 210, a selection by a user for a requested retribution action may be received in response to a perceived offensive action in chat made by another user in chat. In some embodiments, this request may be initiated through a menu selection made by the requesting user in either a chat or gaming environment or both. Operation 210 may be performed by a retribution selection component that is the same as or similar to retribution selection component 112, in accordance with one or more implementations.

At an operation 212, a determination is made with respect to whether a retribution action should be imposed against a perceived offensive user based on at least one condition. In some embodiments, the conditions may include some minimum level of affirmation by other users that they too perceive the action as offensive. This may include contribution of virtual items to a bounty and/or other indications of agreement. Operation 212 may be performed by a determination component that is the same as or similar to determination component 114, in accordance with one or more implementations.

At an operation 214, if a determination is made that a retribution action should be imposed from the previous step, then that retribution action is initiated. In some embodiments, this is implemented through the initiation of a bounty which is available to players meeting one or more conditions that related to in-game accomplishments which are viewed to be detrimental to the offensive chat user. Operation 214 may be performed by a retribution initiation component that is the same as or similar to retribution initiation component 118, in accordance with one or more implementations.

At an operation 216, in-game activity is monitored to determine if and when the aforesaid required conditions for achievement of a bounty are met by one or more players. In addition, when it is determined that these conditions are met by one or more players, virtual goods residing in the accounts of bounty pledging players are moved to the accounts of one or more players that have achieved the conditions necessary to receive the bounty. Operation 216 may be performed by a retribution execution component that is the same as or similar to retribution execution component 122, in accordance with one or more implementations.

Figure 3:
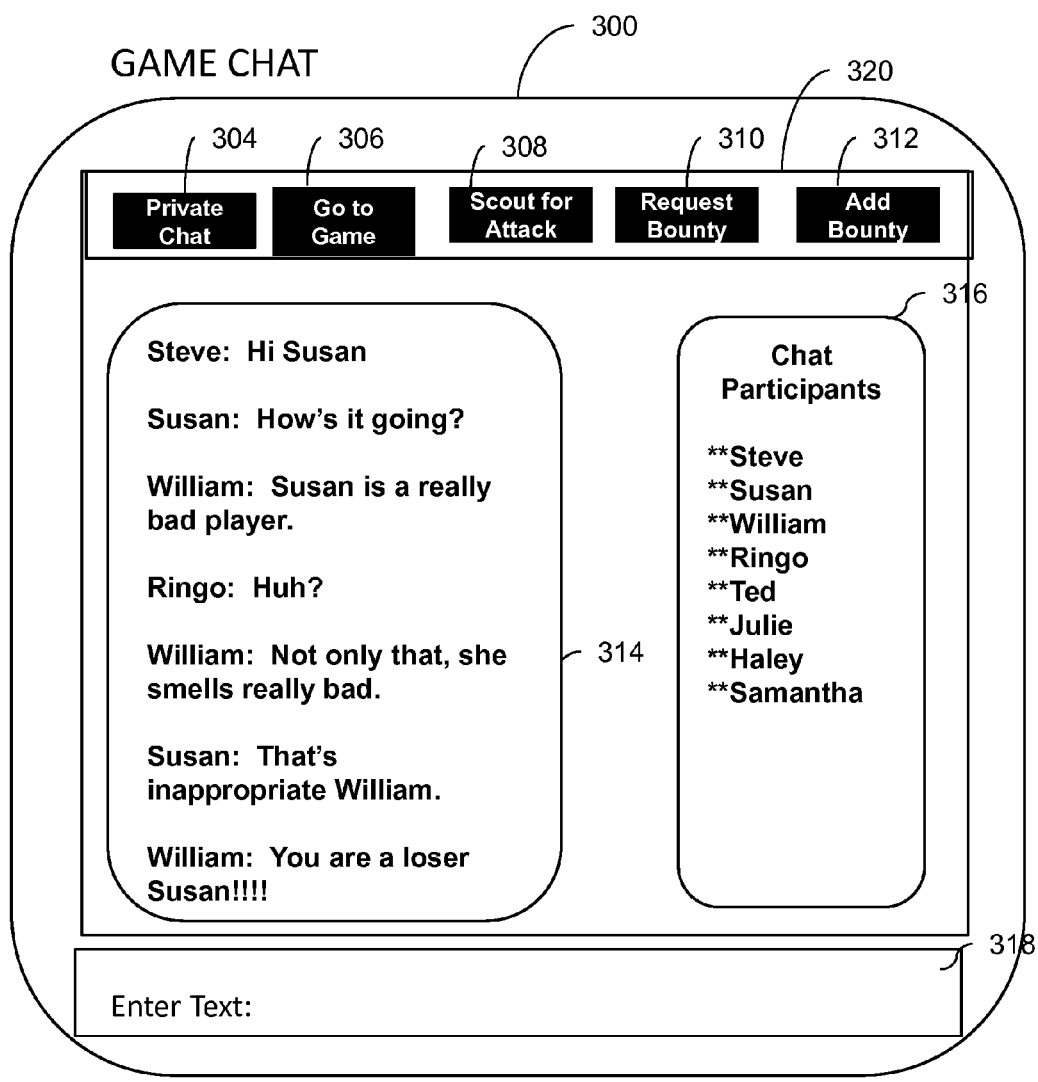
FIG. 3 is an illustration of an exemplary chat interface through which anti-social behavior may be deterred according to the teachings of the present invention.

FIG. 3 is an exemplary illustration of one possible chat interface that may be implemented according to the teachings of the present invention to allow players of online games to interact with one another as well as to make requests for bounties as against players perceived to be engaged in offensive behavior within the chat room. This interface preferably allows for other options associated with communications and activities as between players and with respect to players such as, for example, various social features such as inviting each other to groups, alliances, and other common social interactions. The menu may also provide an option for scouting for attack for game entity associated with a perceived offensive player. Various other menu options are also possible. The menu and the interface shown in FIG. 3 may be associated with a chat environment either integrated within an online game itself or as part of a standalone chat functionality.

FIG. 3 represents one possible layout for a chat environment. In some embodiments, the chat window 300 may be comprised of a communication window 314 through which chat participants can see the text of communications between and among participants. This text may be entered through text entry window 318. Participant window 316 provides a listing of current chat participants which may or may not be actively entering text through text entry window 318. Menu bar 320 offers a number of clickable buttons which may be selected to initiate chat related actions. As will be apparent to one of skill in the art, both the chat layout and the various clickable buttons are merely exemplary and the layout may be varied and the clickable buttons may be different from that shown in FIG. 3 without departing from the scope or the spirit of the present invention.

As can be seen in FIG. 3, button 304 allows for a participant to request a private chat with one or more other participants. Button 306, if selected, may cause a participant to be placed in a gaming environment in the case where the chat functionality is external to the gaming environment. Scout for attack button 308 may cause system 100 to scout for an attack on a player who has engaged in perceived offensive conduct. In the example shown in FIG. 3 and in one embodiment of the present invention, any of the participants in the chat room may click on button 308 causing one or more players to be notified of any opportunities to attack a player who has been perceived to engage in offensive conduct in the chat room. In this case any game entity controlled by William would be scouted for an opportunity to be attacked.

Request bounty button 310 may be used by any player engaged in chat to request that a bounty be placed upon the characters owned or controlled by the perceived offending player as has been described above. This could be either Susan (who has been attacked) or any other player who observes this attack. In some embodiments, upon clicking upon request bounty button 310, a participant requesting a bounty may be presented with a secondary menu requiring such player to pledge at least one virtual item towards the bounty. Along those lines, other participants may use add bounty button 312 to add to the bounty originally offered by the participant that originally requested the bounty via request bounty button 310. Again, this may cause a secondary menu to be displayed which permits the participant to select the virtual item(s) that he or she may wish to add to the bounty.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for moderating communicative behavior between users in a virtual space, the system comprising:
one or more physical computer processors configured by machine-readable instructions to:

execute an instance of an online game, and to use the instance of the online game to facilitate participation by users in the online game via client computing devices wherein the online game facilitates battles between game entities associated with and/or controlled by the individual users in the online game, the individual users including a first user, a second user, a third user, and a fourth user;

manage inventories of virtual items under the control of the individual users in the online game, such inventories including a first inventory of one or more virtual items under control of the first user in the online game;

host a chat session between the users, wherein the chat session is presented to the users through a chat interface on the client computing devices;

receive a selection entered through the chat interface by the first user of a requested retribution action against the second user in response to a perceived offensive action initiated by said second user, the selection of the requested retribution action pledging a bounty of one or more virtual items in the first inventory to any user that successfully makes retribution to the second user in the online game;

determine whether or not a requested retribution action should be imposed against said second user in response to the selection of the requested retribution action, such determination being made based upon at least one of one or more predetermined conditions being satisfied, wherein a first predetermined condition must be satisfied at least partially by one or more actions of the fourth user, and wherein the determination as to whether the requested retribution action should be imposed against the second user based on at least one of the one or more predetermined conditions being satisfied is impacted by whether said first user has historically sought requested retribution actions which have not been collaborated by other users;

initiate, responsive to the first predetermined condition being satisfied, the requested retribution action selected by the first user as an initiated retribution action against said second user; and monitor battles in the online game involving game entities associated with and/or controlled by the second user, and such that by virtue of initiation of the initiated retribution action, and in response to one or more game entities associated with and/or controlled by the third user defeating one or more game entities associated with and/or controlled by the second user in a battle in the online game, the bounty of one or more virtual items is moved from the first inventory to a third inventory associated with the third user.

2. The system of claim 1 wherein satisfaction of the first predetermined condition includes receiving an indication of agreement that said perceived offensive action is offensive from the fourth user.

3. The system of claim 2 wherein said indication of agreement comprises confirmation by the fourth user of the selection by the first user of the requested retribution action against said second user within a predetermined time of said selection of a requested retribution action by said first user.

4. The system of claim 1 wherein satisfaction of the first predetermined condition includes both the first user and the fourth user contributing to the bounty such that the one or more physical computer processors are configured to implement the bounty against said second user only when at least the first user and the fourth user both contribute at least one virtual item to said bounty, such that in response to the one or more game entities associated with and/or controlled by the third user defeating the one or more game entities associated with and/or controlled by the second user in the battle, the bounty of the one or more virtual items is moved from the first inventory and a fourth inventory associated with the fourth user, to a third inventory associated with the third user.

5. The system of claim 1 wherein the one or more physical computer processors are further configured such that a second predetermined condition of the one or more predetermined conditions includes a limit on a number of requested retribution actions that may be requested by said first user within a given timeframe and the second predetermined condition must be satisfied to initiate the requested retribution action selected by the first user.

6. The system of claim 1, wherein the one or more physical computer processors are further configured to receive a selection by the first user and/or the fourth user of the one or more virtual items in the bounty.

7. The system of claim 1, wherein the one or more physical computer processors are further configured such that the one or more virtual items in the bounty includes virtual currency.

8. The system of claim 1, wherein the one or more physical computer processors are further configured to effectuate presentation to the users of the initiation of the initiated retribution action imposed against the second user.

9. The system of claim 1, wherein the one or more physical computer processors are further configured such that the one or more predetermined conditions include an acceptance of the requested retribution action by an administrator.

10. A method of moderating communication between users in a virtual space, the method being implemented on a computer system having one or more physical processors configured by machine-readable instructions which, when executed, perform the method, the method comprising:

executing an instance of an online game, and using the instance of the online game to facilitate participation by users in the online game via client computing devices wherein the online game facilitates battles between game entities associated with and/or controlled by the individual users in the online game, the individual users including a first user, a second user, a third user, and a fourth user;

managing inventories of virtual items under the control of the individual users in the online game, such inventories including a first inventory of one or more virtual items under control of the first user in the online game;

hosting a chat session between the users, wherein the chat session is presented to the users through a chat interface on the client computing devices;

receiving a selection entered through the chat interface by the first user of a requested retribution action against the second user in response to a perceived offensive action initiated by said second user, the selection of the requested retribution action pledging a bounty of one or more virtual items in the first inventory to any user that successfully makes retribution to the second user in the online game;

determining whether or not a requested retribution action should be imposed against said second user in response to the selection of the requested retribution action, such determination being made based upon at least one of one or more predetermined conditions being satisfied, wherein a first predetermined condition must be satisfied at least partially by one or more actions of the fourth user, and wherein the determination as to whether the requested retribution action should be imposed against the second user based on at least one of the one or more predetermined conditions being satisfied is impacted by whether said first user has historically sought requested retribution actions which have not been collaborated by other users;

initiating, responsive to the first predetermined condition being satisfied, the requested retribution action selected by the first user as an initiated retribution action against said second user; and monitoring battles in the online game involving game entities associated with and/or controlled by the second user, and such that by virtue of initiation of the initiated retribution action, and in response to one or more game entities associated with and/or controlled by the third user defeating one or more game entities associated with and/or controlled by the second user in a battle in the online game, the bounty of one or more virtual items is moved from the first inventory to a third inventory associated with the third user.

11. The method of claim 10 wherein satisfaction of the first predetermined condition includes receiving an indication of agreement that said perceived offensive action is offensive from the fourth user.

12. The method of claim 11 wherein said indication of agreement comprises confirmation by the fourth user of the selection by the first user of the requested retribution action against said second user within a predetermined time of said selection of a requested retribution action by said first user.

13. The method of claim 10 wherein satisfaction of the first predetermined condition includes both the first user and the fourth user contributing to the bounty such that the bounty against said second user is implemented only when at least the first user and the fourth user contribute at least one virtual item to said bounty, such that in response to the one or more game entities associated with and/or controlled by the third user defeating the one or more game entities associated with and/or controlled by the second user in the battle, the bounty of the one or more virtual items is moved from the first inventory and a fourth inventory associated with the fourth user, to a third inventory associated with the third user.

14. The method of claim 10 wherein a second predetermined condition of the one or more predetermined conditions includes a limit on a number of requested retribution actions that may be requested by said first user within a given timeframe and the second predetermined condition must be satisfied to initiate the requested retribution action selected by the first user.

15. The method of claim 10, further comprising receiving a selection by the first user and/or the fourth user of the one or more virtual items in the bounty.

16. The method of claim 10, wherein the one or more virtual items in the bounty includes virtual currency.

17. The system of claim 10, further comprising effectuating presentation to the users of the initiation of the initiated retribution action imposed against the second user.

18. The method of claim 10, wherein the one or more predetermined conditions include an acceptance of the requested retribution action by an administrator.

* * * * *